(12) United States Patent
Anderson

(10) Patent No.: US 6,874,295 B2
(45) Date of Patent: Apr. 5, 2005

(54) INSULATING UNIT FOR AN ELECTRICAL BOX

(76) Inventor: Joel L. Anderson, 613-2nd St. NE., Jamestown, ND (US) 58401

( * ) Notice: Subject to any disclaimer, the term of this patent is extended or adjusted under 35 U.S.C. 154(b) by 268 days.

(21) Appl. No.: 10/210,998

(22) Filed: Jul. 31, 2002

(65) Prior Publication Data

US 2004/0020925 A1 Feb. 5, 2004

(51) Int. Cl.[7] .............................................. E04B 1/00
(52) U.S. Cl. ................... 52/741.4; 52/742.1; 52/742.12; 52/407.3; 52/407.1; 52/404.1; 52/220.1; 52/300.1; 52/741.1; 52/750; 52/403.4; 52/407.5; 220/3.3; 156/71; 156/295; 174/50; 174/52.1; 174/53; 174/58
(58) Field of Search .......................... 174/50, 52.1, 53, 174/58; 52/741.4, 742.1, 742.12, 407.3, 407.1, 409.1, 220.1, 309.1, 741.1, 750, 407.4, 407.5, 404.1; 220/3.3; 156/71, 295

(56) References Cited

U.S. PATENT DOCUMENTS

| | | | | |
|---|---|---|---|---|
| 4,616,104 A | * | 10/1986 | Lindsey | 174/48 |
| 4,667,840 A | * | 5/1987 | Lindsey | 220/3.2 |
| 4,673,097 A | * | 6/1987 | Schuldt | 220/3.5 |
| 4,952,754 A | * | 8/1990 | Rye | 174/53 |
| 5,287,665 A | * | 2/1994 | Rath, Jr. | 52/220.8 |
| 5,771,645 A | | 6/1998 | Porter | 52/220.2 |
| 6,103,381 A | | 8/2000 | Mokerji | 174/17 |
| 6,147,304 A | * | 11/2000 | Doherty | 174/48 |
| 6,239,365 B1 | * | 5/2001 | McEvers | 174/50 |
| 6,649,835 B2 | * | 11/2003 | Gilleran | 174/58 |

* cited by examiner

*Primary Examiner*—Carl D. Friedman
*Assistant Examiner*—Steve Varner

(57) ABSTRACT

An insulating unit for an electrical box for insulating an electrical box. The insulating unit for an electrical box includes a rear portion, a lower portion extending from the rear portion, an upper portion extending from the rear portion opposite of the lower portion, and a side portion extending from the rear portion defining a rectangular cavity for receiving the electrical box within. A cutout may be made within the upper portion, side portion or lower portion for receiving a wire. Sealants are preferably utilized for sealing and securing to a wall stud. The rear portion, lower portion, upper portion and side portion are preferably comprised of an insulating material.

6 Claims, 5 Drawing Sheets

INSULATING UNIT FOR AN ELECTRICAL BOX

CROSS REFERENCE TO RELATED APPLICATIONS

Not applicable to this application.

STATEMENT REGARDING FEDERALLY SPONSERED RESEARCH OR DEVELOPMENT

Not applicable to this application.

BACKGROUND OF THE INVENTION

1. Field of the Invention

The present invention relates generally to electrical boxes and more specifically it relates to an insulating unit for an electrical box for insulating an electrical box.

2. Description of the Related Art

Electrical boxes have been in use for years for providing electrical connections for items such as but not limited to electrical outlets, telephone outlets, computer network outlets, and television cable outlets. Conventional electrical boxes are comprised of a hollow rectangular housing structure that are secured to a wall stud and typically have one or more openings within for allowing wires to pass through. A coupler plate is typically attached to the front opening of the electrical box.

The main problem with conventional electrical boxes is that they are not insulated and result in a significant loss of heating/cooling energy. Another problem with conventional electrical boxes is that they create a space behind them that is difficult to extend conventional fiber insulation into.

Examples of patented devices which may be related to the present invention include U.S. Pat. No. 4,667,840 to Lindsey; U.S. Pat. No. 4,616,104 to Lindsey; U.S. Pat. No. 6,103,381 to Keith; and U.S. Pat. No. 5,771,645 to Porter.

While these devices may be suitable for the particular purpose to which they address, they are not as suitable for insulating an electrical box. Conventional electrical boxes are not insulated thereby resulting in significant energy loss within a building structure.

In these respects, the insulating unit for an electrical box according to the present invention substantially departs from the conventional concepts and designs of the prior art, and in so doing provides an apparatus primarily developed for the purpose of insulating an electrical box.

BRIEF SUMMARY OF THE INVENTION

In view of the foregoing disadvantages inherent in the known types of electrical boxes now present in the prior art, the present invention provides a new insulating unit for an electrical box construction wherein the same can be utilized for insulating an electrical box.

The general purpose of the present invention, which will be described subsequently in greater detail, is to provide a new insulating unit for an electrical box that has many of the advantages of the electrical boxes mentioned heretofore and many novel features that result in a new insulating unit for an electrical box which is not anticipated, rendered obvious, suggested, or even implied by any of the prior art electrical boxes, either alone or in any combination thereof.

To attain this, the present invention generally comprises a rear portion, a lower portion extending from the rear portion, an upper portion extending from the rear portion opposite of the lower portion, and a side portion extending from the rear portion defining a rectangular cavity for receiving the electrical box within. A cutout may be made within the upper portion, side portion or lower portion for receiving a wire. Sealants are preferably utilized for sealing and securing to a wall stud. The rear portion, lower portion, upper portion and side portion are preferably comprised of an insulating material.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an insulating unit for an electrical box that will overcome the shortcomings of the prior art devices.

A second object is to provide an insulating unit for an electrical box for insulating an electrical box.

Another object is to provide an insulating unit for an electrical box that is positionable about an existing electrical box.

An additional object is to provide an insulating unit for an electrical box that may be formed to fit about various electrical box configurations.

A further object is to provide an insulating unit for an electrical box that decrease energy costs for a building owner.

Another object is to provide an insulating unit for an electrical box that are easy to install about an electrical box.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
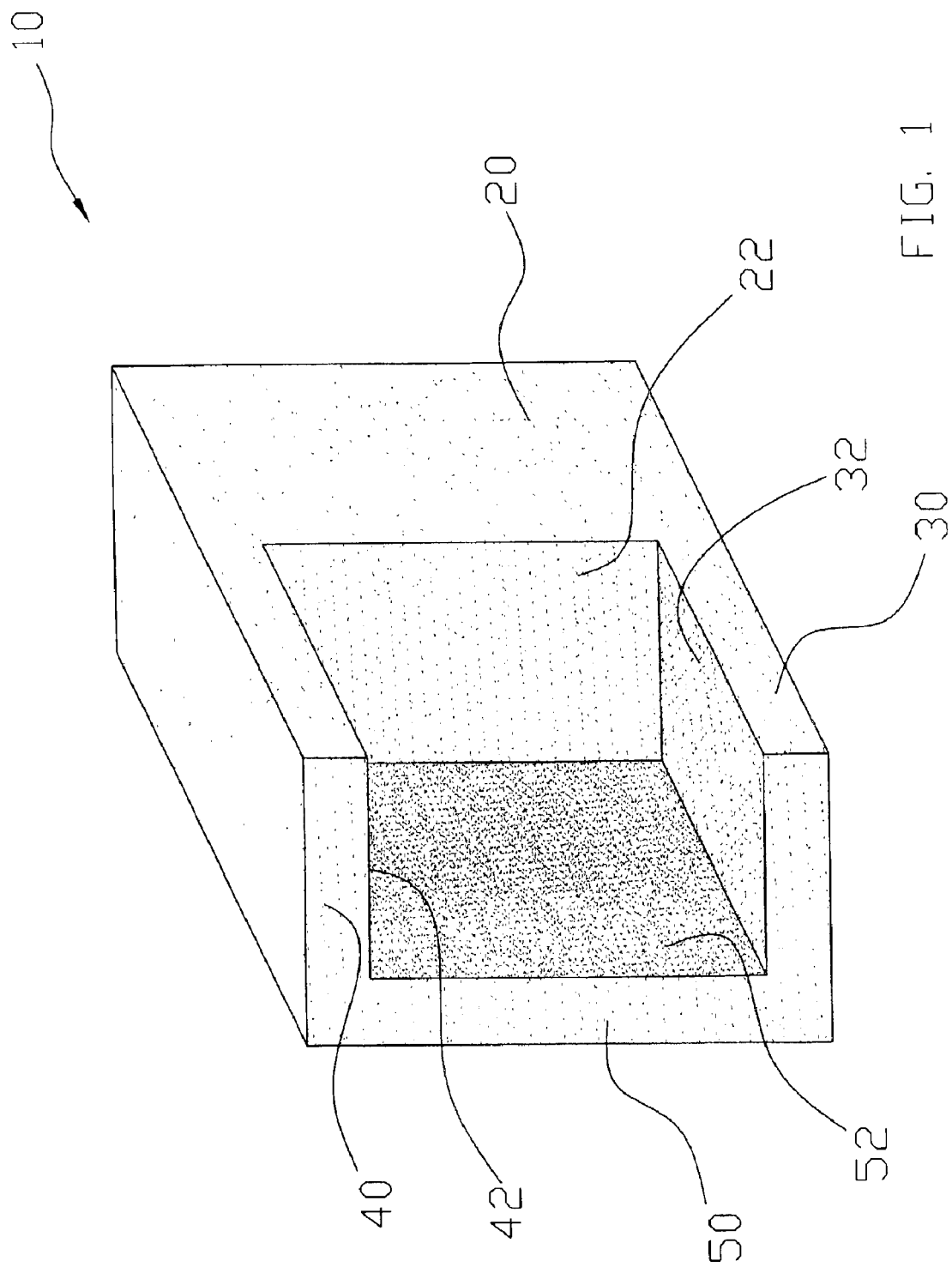
FIG. 1 is an upper perspective view of the present invention.

Turning now descriptively to the drawings, in which similar reference characters denote similar elements throughout the several views, FIGS. 1 through 5 illustrate an insulating unit for an electrical box 10, which comprises a rear portion 20, a lower portion 30 extending from the rear portion 20, an upper portion 40 extending from the rear portion 20 opposite of the lower portion 30, and a side portion 50 extending from the rear portion 20 defining a rectangular cavity for receiving the electrical box 18 within. A cutout 44 may be made within the upper portion 40, side portion 50 or lower portion 30 for receiving a wire 16. Sealants are preferably utilized for sealing and securing to a wall stud 11. The rear portion 20, lower portion 30, upper portion 40 and side portion 50 are preferably comprised of an insulating material.

Figure 5:
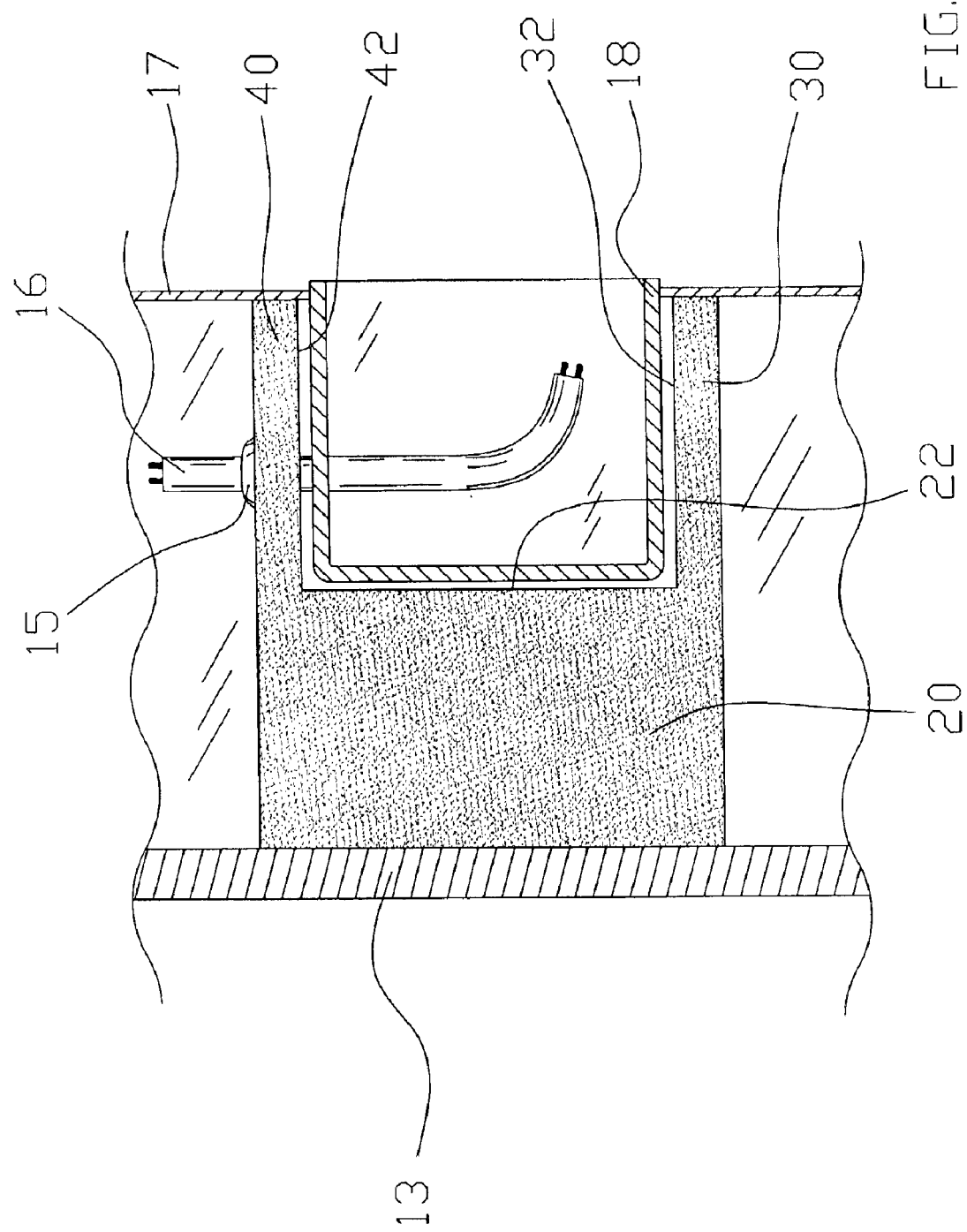
FIG. 5 is a side cutaway view of the present invention positioned about an electrical box.

As shown in FIG. 1 of the drawings, the present invention is basically comprised of a rear portion 20, a lower portion 30, an upper portion 40 and a side portion 50. The rear portion 20 is comprised of a solid structure and preferably has a solid rectangular shape. The depth of the rear portion 20 is preferably sufficient to extend between the rear side of the electrical box 18 to a rear wall 13 with a limited amount of space as best illustrated in FIG. 5 of the drawings.

Figure 2:
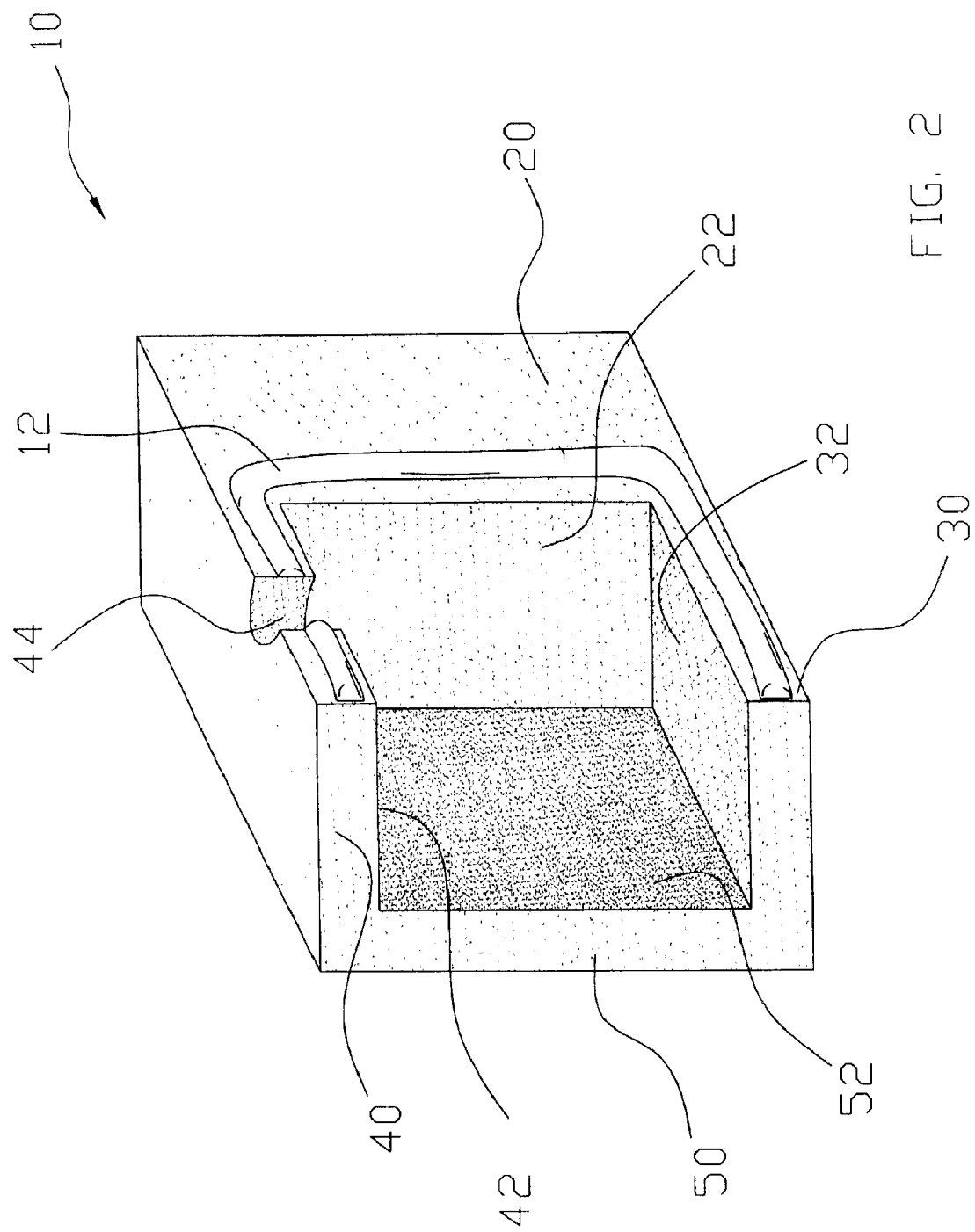
FIG. 2 is an upper perspective view of the present invention with a first sealant applied.
Figure 3:
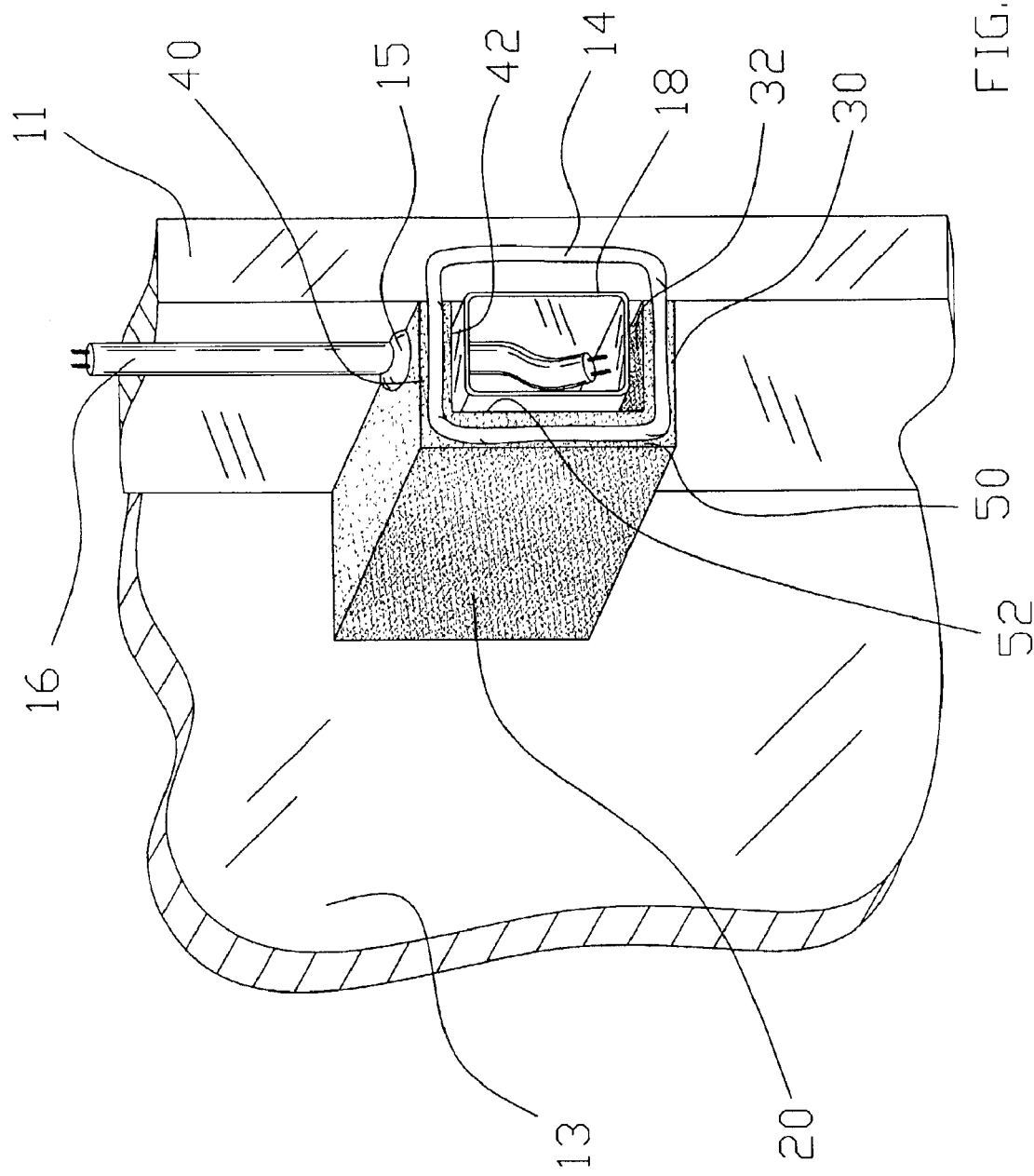
FIG. 3 is an upper perspective view of the present invention attached to a wall stud with a second sealant and third sealant applied.

The height and width of the rear portion 20 are preferably greater than the height and width of the electrical box 18 as best illustrated in FIG. 3 of the drawings. The rear portion 20 may have various other shapes and sizes not illustrated in FIGS. 1 through 5 of the drawings. The rear portion 20 has a rear surface 22 that is juxtaposed to the rear side of the electrical box 18 as best shown in FIGS. 1 and 2 of the drawings.

The lower portion 30 extends forwardly from a lower part of the rear portion 20. The lower portion 30 is preferably comprised of a relatively thinner structure than the rear portion 20. The lower portion 30 has an upper surface 32 that is juxtaposed to the bottom side of the electrical box 18 as best shown in FIGS. 1 and 2 of the drawings.

The side portion 50 extends forwardly from a side part of the rear portion 20. The side portion 50 is preferably comprised of a relatively thinner structure than the rear portion 20 similar to the lower portion 30. The side portion 50 has a side surface 52 that is juxtaposed to the side of the electrical box 18 as best shown in FIGS. 1 and 2 of the drawings.

The upper portion 40 extends forwardly from an upper part of the rear portion 20. The upper portion 40 is preferably comprised of a relatively thinner structure than the rear portion 20 similar to the lower portion 30 and the side portion 50. The upper portion 40 has a lower surface 42 that is juxtaposed to the top side of the electrical box 18 as best shown in FIGS. 1 and 2 of the drawings.

The combination of the rear portion 20, lower portion 30, the side portion 50 and the upper portion 40 define an interior rectangular cavity for receiving the electrical box 18. The interior rectangular cavity may be slightly larger than the electrical box 18 for allowing conforming to irregularities such as misaligned attachment of the electrical box 18 to a wall stud 11. The interior rectangular cavity has a front opening and a side opening connected to one another as best illustrated in FIG. 1 of the drawings.

As shown in FIG. 2 of the drawings, at least one cutout 44 may be cut into the upper portion 40 or the side portion 50 or the lower portion 30 for receiving a wire 16 entering the electrical box 18. The cutout 44 may have various sizes and shapes sufficient for allowing passage of the wire 16 through thereof. It may also be appreciated that an aperture may extend through the rear portion 20, the lower portion 30, the upper portion 40 or the side portion 50 for receiving a wire 16 or other object.

The rear portion 20, the lower portion 30, the upper portion 40 and the side portion 50 are preferably comprised of an insulating material that is easy to work with and relatively lightweight. A suitable material that the applicant has found useful is a light resilient foam of polystyrene (manufactured under the trademark STYROFOAM). Various other materials having insulating properties may be utilized to construct the present invention such as but not limited to plastic or wood. The invention may also be easily trimmed to fit various electrical boxes 18 and situations.

Figure 4:
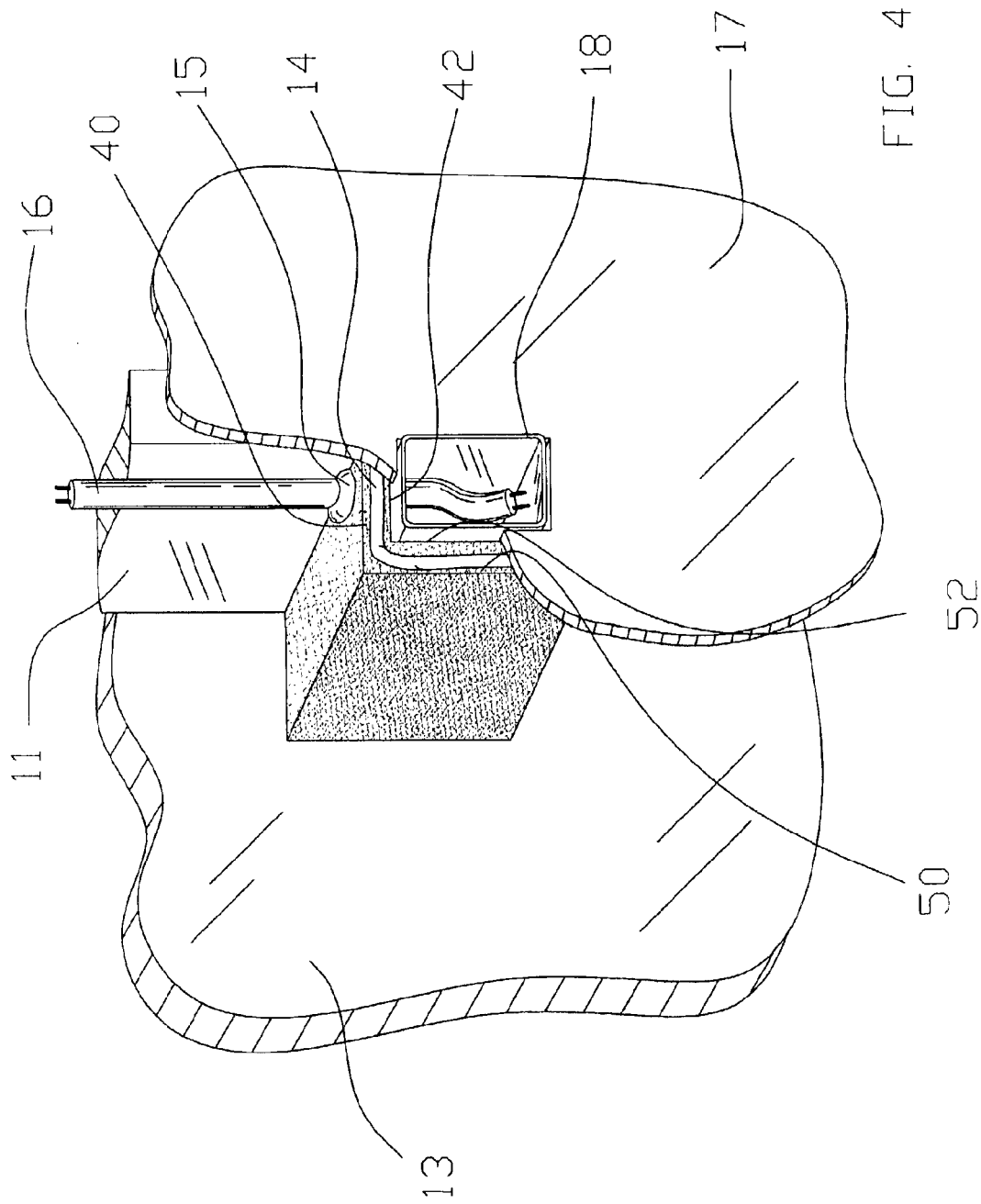
FIG. 4 is an upper perspective view of the present invention with a wall covering secured about the electrical box.

In use, the user first cuts any desired cutout 44 or aperture within the present invention to allow for the passage of a wire 16 or other object. The user then applies a first sealant 12, such as caulking or silicon, to the side edge of the upper portion 40, the lower portion 30 and the rear portion 20 that is to be juxtaposed with respect to a wall stud 11 as shown in FIG. 2 of the drawings. The user then positions the invention about the electrical box 18 and presses the invention so that the first sealant 12 engages and secures to the side of the wall stud 11 as best illustrated in FIG. 3 of the drawings. The user then inserts the wire 16 into the cutout 44 or aperture into the electrical box 18 (or the wire 16 may already have been positioned within the electrical box 18). The user then applies a second sealant 14 to the front edge of the upper portion 40, side portion 50, lower portion 30 and the wall stud 11 as shown in FIG. 3 of the drawings. The user also preferably applies a third sealant 15 about the wire 16 and the cutout 44 as shown in FIG. 3 of the drawings. Fiber insulation or other insulation is then positioned between the wall studs 11 and about the present invention. A front covering 17 is then preferably secured to the wall stud 11 and the present invention with the second sealant 14 sealing to an inner surface of the front covering 17 as shown in FIGS. 4 and 5 of the drawings. It can be appreciated that sealant may also be applied to the rear surface 22, the upper surface 32, the lower surface 42 and the side surface 52 for securing to the electrical box 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of installing an insulating unit about an electrical box secured to a wall stud, said insulating unit comprised of a rear portion, a lower portion extending forwardly from said rear portion, a side portion extending forwardly from said rear portion and connected to said lower portion, and an upper portion extending forwardly from said rear portion and connected to said side portion thereby forming a rectangular cavity within for receiving an electrical box, said method comprising the steps of:

(a) applying a first sealant about a side edge of said lower portion, said upper portion and said rear portion; and (b) positioning said insulating unit about said electrical box such that said first sealant engages said wall stud.

2. The method of installing an insulating unit of claim 1, including the step of (c) applying a second sealant about a front edge of said upper portion, said side portion, said lower portion and said wall stud.

3. The method of installing an insulating unit of claim 2, including the step of (d) securing a front covering to said second sealant.

4. A method of installing an insulating unit about an electrical box secured to a wall stud, said insulating unit comprised of a rear portion, a lower portion extending forwardly from said rear portion, a side portion extending forwardly from said rear portion and connected to said lower portion, and an upper portion extending forwardly from said rear portion and connected to said side portion thereby forming a rectangular cavity within for receiving an electrical box, said method comprising the steps of:

(a) cutting a cutout or an aperture within said insulating unit;

(b) applying a first sealant about a side edge of said lower portion, said upper portion and said rear portion; and (c) positioning said insulating unit about said electrical box such that said first sealant engages said wall stud.

5. The method of installing an insulating unit of claim 4, including the step of (c) applying a second sealant about a front edge of said upper portion, said side portion, said lower portion and said wall stud.

6. The method of installing an insulating unit of claim 5, including the step of (d) securing a front covering to said second sealant.

* * * * *